UNITED STATES PATENT OFFICE.

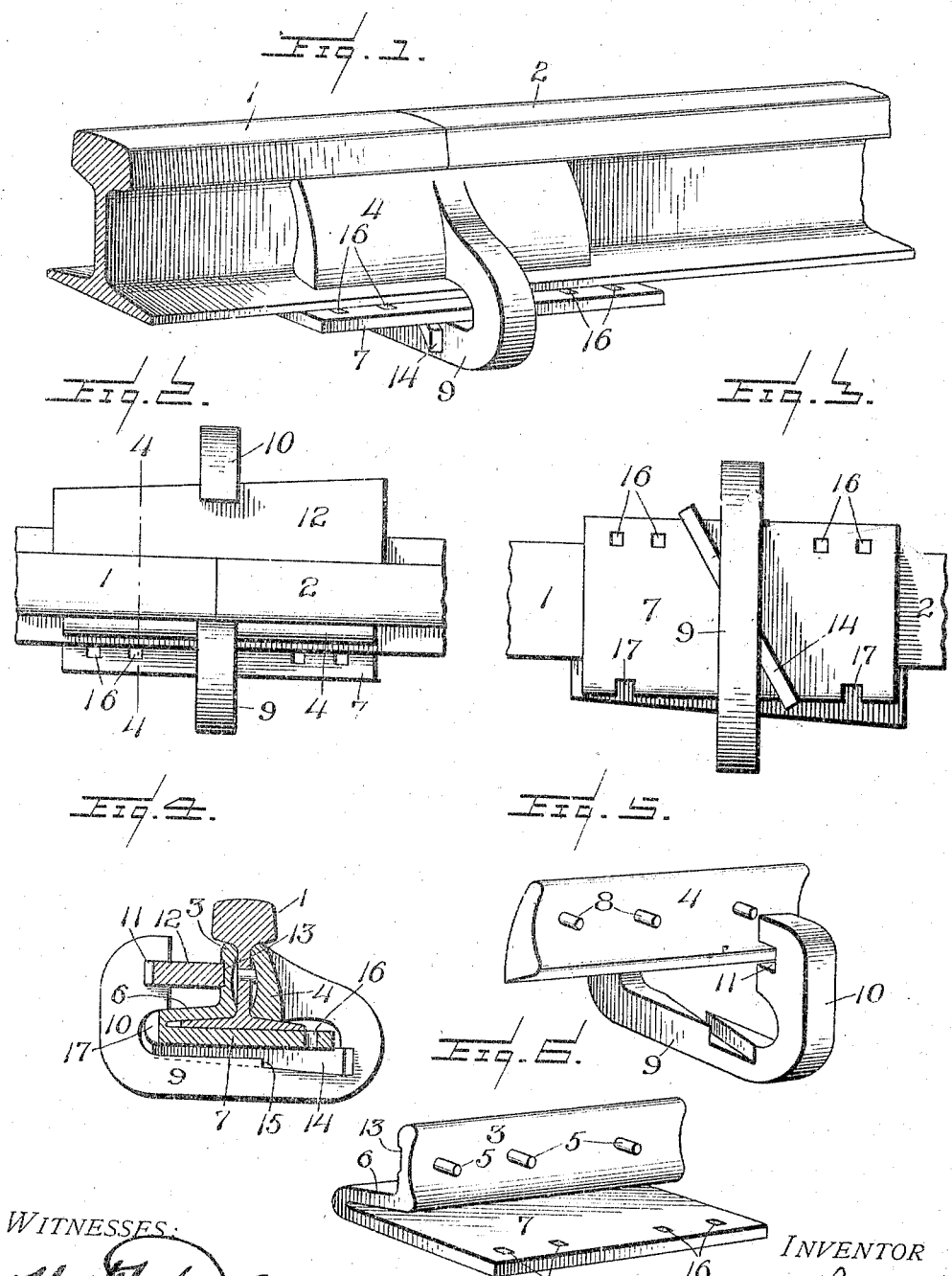

SAMUEL LEE, OF SOUTH CONNELLSVILLE, PENNSYLVANIA, ASSIGNOR OF ONE-FOURTH TO JAMES S. LEE, OF BANNING STATION, PENNSYLVANIA.

RAIL-JOINT.

967,530.  Specification of Letters Patent. Patented Aug. 16, 1910.

Application filed December 8, 1909. Serial No. 532,118.

*To all whom it may concern:*

Be it known that I, SAMUEL LEE, a citizen of the United States of America, residing at South Connellsville, in the county of Fayette and State of Pennsylvania, have invented certain new and useful Improvements in Rail-Joints the principles of which are new, of which the following is a specification.

My invention relates to rail joints and has for its object to provide a durable and inexpensive device of the class described, in which the use of bolts is dispensed with and a base is provided for the ends of the rails which will withstand the shock incident to the passing of the car wheels from one rail to the other.

Further objects and advantages will appear in the following description and claims, forming a part of this application.

In the drawings, Figure 1 is a perspective view of my improved rail joint. Fig. 2 is a top plan view of the same. Fig. 3 is a bottom plan view. Fig. 4 is a vertical transverse section on line 4—4 of Fig. 2. Fig. 5 is a detail perspective view of one of the fish plates. Fig. 6 is a similar view of the opposite fish plate.

Similar numerals indicate corresponding parts in all the figures of the drawings.

1 and 2 indicate the adjoining ends of two rails and 3 and 4, the fish plates. The fish plate 3 is provided with integral studs 5, designed and located to enter some of the perforations in the ends of the rails usually occupied by the bolts; this fish plate is also provided with an extension 6 lying above the flange of the rail and a base portion 7 extending beneath the rail on which the adjoining ends of the rails rest. The fish plate 4 is provided with studs 8 similar to studs 5 and an integral arm 9 to extend when the parts are assembled beneath the plate 7 and then up as shown at 10 and is provided at its upper portion with a notch 11 in which a wedge 12 is inserted between it and a seat 13 provided for it on the outer face of the fish plate 3. The wedge, when driven tightly to place will hold both fish plates firmly in place. There is some space allowed between the arm 9 and the plate 7 so as to permit of quick assembling of the parts and into this space is driven a wedge 14 at such an angle as shown in Fig. 3 to support plate 7 its entire width. A notch 15 is provided in the arm 9 in which the lower edge of the wedge 14 rests, thus providing against accidental displacement thereof. Perforations 16 are provided in the plate 7 for the reception of the ordinary spikes, and notches 17 are provided in the outer edge of plate 6 for spikes. It will be noted that the spikes entering openings 16 will rest in their usual position in relation to the rail and thereby offer additional means for securely holding the parts of my device in their proper positions.

The base portion 7 of the fish plate 3 extends beneath the abutting ends of the rails, forming a firm support for same and holding the ends of the rails true thereby forming a smooth joint.

What I claim and desire to secure by Letters Patent is:—

1. A rail joint comprising fish plates arranged on opposite sides of the rail, having integral lugs adapted to enter apertures in the rails, one of said fish plates extending around the flange and beneath the rails to form a base plate, and an arm extending from the opposite fish plate beneath said base plate and rails and to a point adjacent to the first mentioned fish plate, a wedge inserted between said arm and the adjacent fish plate and a wedge inserted between said arm and the base plate, substantially as described.

2. A rail joint comprising a fish plate having lugs entering openings in the rails, arranged on one side and extending beneath same to form a chair or bed plate, a wedge inserted between said fish plate and an arm extending from the opposite fish plate, and a wedge inserted between said arm and the bed plate, substantially as described.

3. In a rail joint, fish plates arranged on opposite faces of the rails, having inwardly projecting lugs adapted to enter apertures in the ends of the rails, a bed plate formed integral with one of the fish plates, an arm extending from the other fish plate beneath said bed plate to a point adjacent to the first named fish plate, a wedge inserted between said arm and the adjacent fish plate, and a wedge inserted between said arm and the bed plate, substantially as described.

In testimony whereof I affix my signature in presence of two witnesses.

SAMUEL LEE.

Witnesses:
T. R. J. CAMPBELL,
CHAS. J. BROWN.